(12) United States Patent
Gorman

(10) Patent No.: US 9,932,961 B1
(45) Date of Patent: Apr. 3, 2018

(54) REPLACEMENT AIRFOIL BLADES FOR A WIND POWER GENERATOR

(71) Applicant: Jeremy W. Gorman, Wilmington, VT (US)

(72) Inventor: Jeremy W. Gorman, Wilmington, VT (US)

(*) Notice: Subject to any disclaimer, the term of this patent is extended or adjusted under 35 U.S.C. 154(b) by 11 days.

(21) Appl. No.: 15/268,342

(22) Filed: Sep. 16, 2016

(51) Int. Cl.
| | |
|---|---|
| *F01D 1/06* | (2006.01) |
| *F03D 1/06* | (2006.01) |
| *F03D 1/04* | (2006.01) |
| *F03D 9/00* | (2016.01) |
| *F03D 9/25* | (2016.01) |
| *F03D 13/20* | (2016.01) |
| *F03D 80/80* | (2016.01) |

(52) U.S. Cl.
CPC ............ *F03D 1/0658* (2013.01); *F03D 1/04* (2013.01); *F03D 1/0675* (2013.01); *F03D 9/002* (2013.01); *F03D 9/25* (2016.05); *F03D 13/20* (2016.05); *F03D 80/88* (2016.05)

(58) Field of Classification Search
CPC ........ F03D 1/0658; F03D 1/06; F03D 1/0675; F03D 1/04; F03D 1/064; F03D 9/25; F03D 9/002; F03D 13/20; F03D 80/88
See application file for complete search history.

(56) References Cited

U.S. PATENT DOCUMENTS

| | | | | |
|---|---|---|---|---|
| 3,130,677 | A * | 4/1964 | Liebhart | ............ A01M 7/0014 239/171 |
| 4,068,132 | A * | 1/1978 | Bardekoff | ................ F03D 1/02 290/44 |
| 4,420,354 | A | 12/1983 | Gougeon | |
| 4,915,590 | A | 4/1990 | Eckland et al. | |
| 6,371,730 | B1 | 4/2002 | Wobben | |
| 7,530,168 | B2 | 5/2009 | Sorensen | |
| 7,993,103 | B2 | 8/2011 | Cairo | |
| 8,545,182 | B2 | 10/2013 | Sorensen | |
| 2011/0120108 | A1* | 5/2011 | Garmong | ............. F03D 1/0658 60/398 |
| 2013/0302169 | A1* | 11/2013 | Hennes | ................ F03B 13/264 416/170 R |

FOREIGN PATENT DOCUMENTS

| | | | | |
|---|---|---|---|---|
| DE | 10113609 C1 * | 3/2002 | ............... | F01D 5/30 |
| EP | 0894708 A2 * | 2/1999 | ............... | B63H 1/20 |

* cited by examiner

*Primary Examiner* — Logan Kraft
*Assistant Examiner* — Joshua R Beebe
(74) *Attorney, Agent, or Firm* — Paul R Martin

(57) ABSTRACT

A wind power generator having blades which are detachably mounted on a hub whereby the blades can be easily and efficiently removed and replaced as necessary.

8 Claims, 6 Drawing Sheets

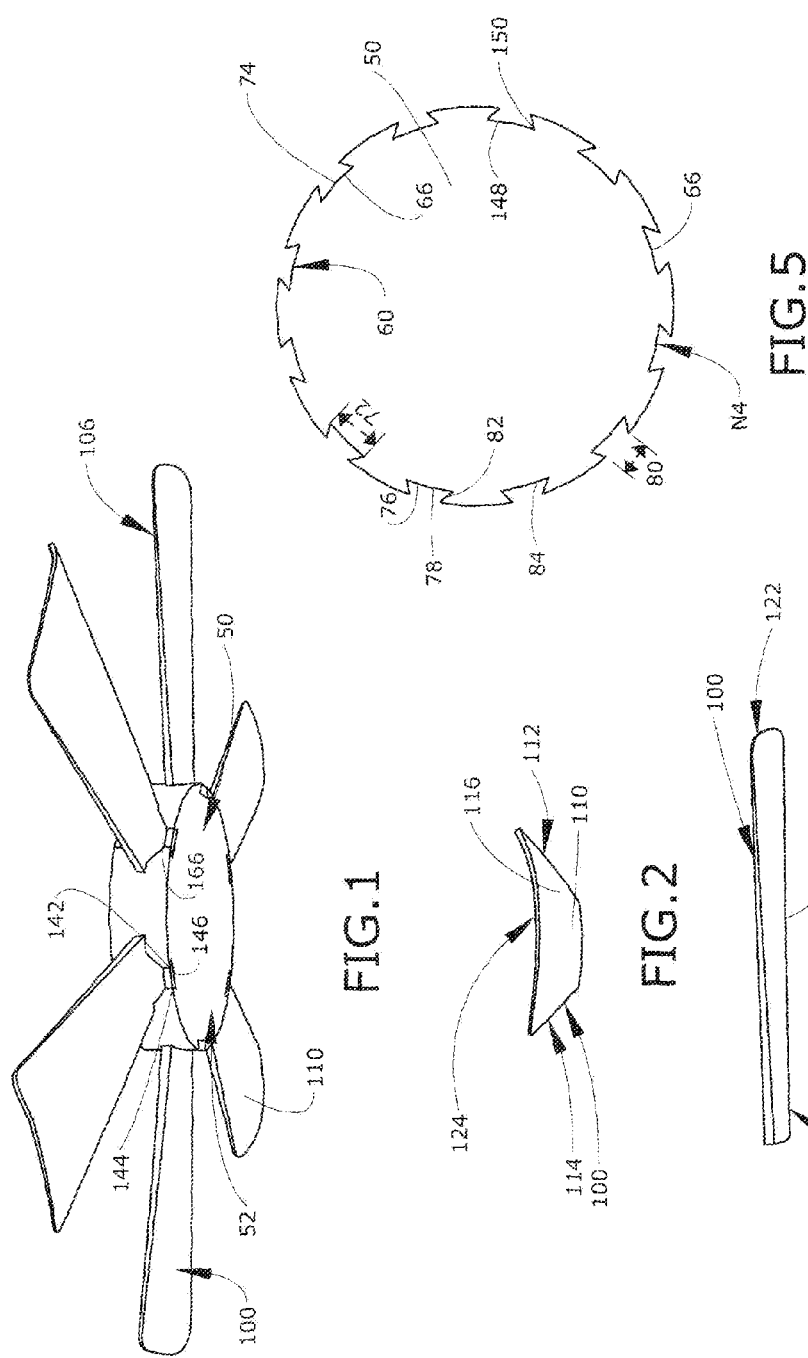

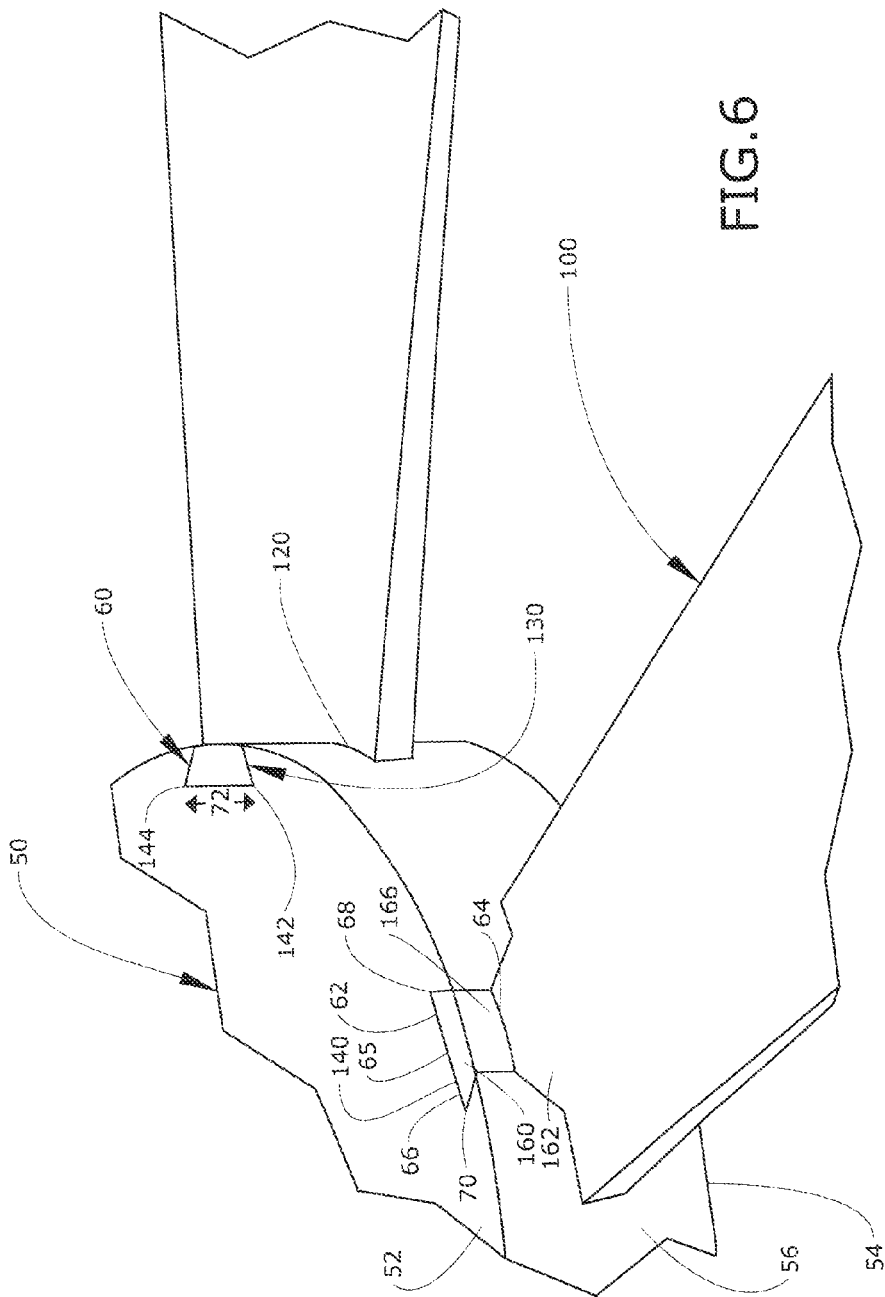

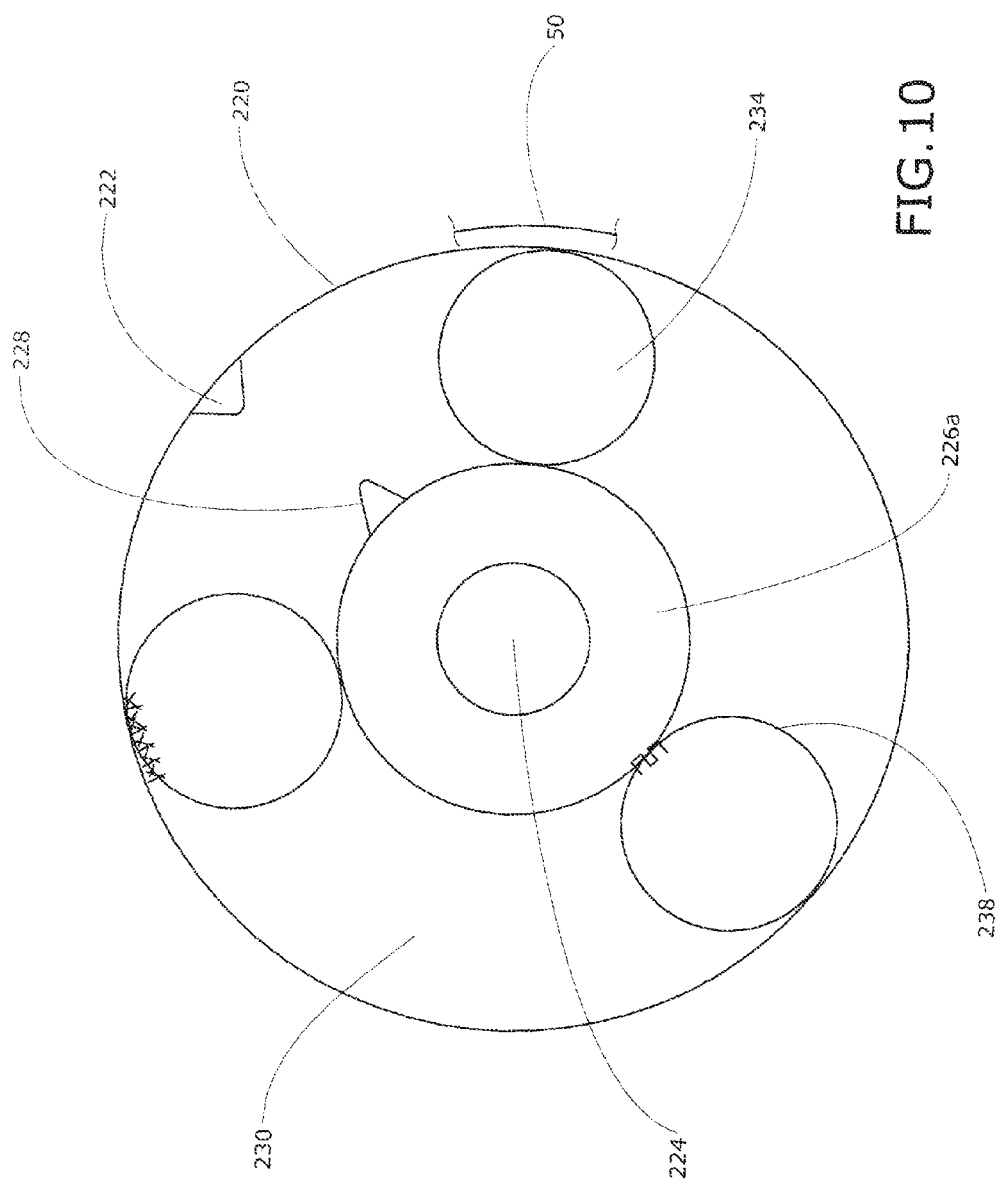

REPLACEMENT AIRFOIL BLADES FOR A WIND POWER GENERATOR

TECHNICAL FIELD OF THE INVENTION

This invention relates generally to rotary machines and more particularly, to methods and apparatus for attaching wind turbine blades to a hub.

BACKGROUND OF THE INVENTION

Generally, wind power generating systems convert kinetic energy created by wind into electric energy.

Wind turbines have been used for decades to exploit the energy of the wind e.g. to produce electricity. To reduce the price of electricity produced by such wind turbines, the size of the wind turbines have increased to a current average nominal power of commercial wind turbines of approximately 1.5 MW, while wind turbines of up to 3 MW are under development, and it is expected that even larger wind turbines will be marketed in the coming years. Common commercial wind turbines have three blades, which by a 1.5 MW wind turbine have a length of approximately 35 m.

Typically, such a wind power generating system includes a tower which is supported on supporting ground, a nacelle which is provided on the upper end of the tower, and a blade which is coupled to the front end of the nacelle. The nacelle has therein several devices, such as a gear box, a generator, an inverter, etc., which are necessary to generate electricity. In the wind power generating system, the blade and the gear box convert kinetic energy created by wind into high-speed kinetic energy of 1500 rpm or more. The generator coupled to the gear box converts the high-speed kinetic energy into electric energy.

Here, in the case of electronic elements installed in the nacelle, the performance thereof may be lowered after they have been used for a predetermined period of time. Some of the elements may require replacement. Particularly, in the case where the wind power generating system is used offshore, abrupt malfunction may be induced by water, salinity, etc., so that an emergency repair may be required.

Generally, a wind turbine includes a rotor having multiple blades. The rotor is mounted on a housing, or nacelle, that is positioned on top of a truss or tubular tower. Utility grade wind turbines (i.e., wind turbines designed to provide electrical power to a utility grid) can have large rotors, e.g., 30 meters (m) (98 feet (ft)) or more in diameter. Blades, attached to rotatable hubs on these rotors, transform mechanical wind energy into a mechanical rotational torque that drives one or more generators. The generators are generally, but not always, rotationally coupled to the rotor through a gearbox. The gearbox steps up the inherently low rotational speed of the turbine rotor for the generator to convert the rotational mechanical energy to electrical energy, which is fed into a utility grid. Gearless direct drive turbines also exist.

Some examples of stress factors are vertical wind shear, localized turbulence (including interaction of the rotor with the tower), gravity, wind flow variations and start-stop cycles. Vertical wind shear is typically defined as the relationship between wind speeds and height above the surface of the earth, i.e., altitude. In general, as the altitude increases, wind speed increases. Given a blade of 30 meters (98 ft) or more, and the subsequent large diameter of rotation (at least twice the blade length plus the diameter of the associated hub), wind speed can increase 5% to 10% above that at the hub centerline from the hub centerline up to the end of the blade at the blade tip with the blade pointing straight upward. The wind speed may also decrease 5% to 10% below that at the hub centerline from the hub centerline down to the end of the blade at the blade tip with the blade pointing straight downward. As the blades rotate, the cyclic increasing and decreasing of the wind shear induces a cyclic stress within the blades.

Localized turbulence includes stationary wakes and bow waves induced by the blades and by the near proximity of the rotating blades to the tower. As the blades rotate through these localized regions, additional stresses are induced within the blades. Also, as the blades rotate, gravity induces fluctuating bending moments within the blades that also induce stresses. Cyclic acceleration and deceleration of the blades due to the aforementioned wind flow variations and start-stop cycles induce cyclic stresses on the blades as well.

The blades are typically designed and manufactured to withstand such stresses including the cumulative impact of such stresses in a variety of combinations. The blades are also designed and manufactured to withstand the cumulative impact of a predetermined number of stress cycles, commonly referred to as fatigue cycles. Upon exceeding the predetermined number of fatigue cycles, the potential for material delamination may increase.

As described above, blades are typically attached to a rotating hub at attachment regions designed and fabricated to receive the blades. The blades also have integral attachment regions. The hub and the blade attachment regions act as load transfer regions. For example, the weight of the blades and the aforementioned cyclic stresses are transferred to the hub attachment regions via the blade attachment regions.

With wind energy plants, the fastening of the rotor blades, which are subjected to considerable forces, to the shaft of the wind energy plant, which is coupled to the generator, is a general problem, since due to the forces acting upon the rotor the components used are exposed to extreme stresses. The structural form of the so-called rotor blade connection is thus of great significance.

The blades are subject to large forces and bending moments inter alia due to the wind pressure and due to the weight and rotation of the blades, and further the blades are subject to fatigue because of the cyclic load. For example, during one revolution, the blade travels through a region of maximum wind load in the upper part of the circle, whereas the blade experiences a low wind area (or even lee), when the blade passes the tower, and further the wind is normally not constant, as there may be gusts of wind. Naturally the root of the blade and the connection of the blade to the hub must be able to withstand the load of the blade, and a failure of the blade root or the hub would be devastating and potentially fatal to persons near the wind turbine.

With one known wind energy plant, the rotor blade, consisting of a compound material, is connected in the region of the so-called rotor blade base, i.e. in the rotor blade's end region that is to be coupled to the rotor hub, to a metallic flange that consists of an inner and outer ring flange; in this, the rotor blade base is set between the inner and the outer ring flange and is fastened by means of an adhesive and a threaded connection. For the producing of the threaded connection, a bolt is inserted through a passage bore, which passes completely through the rotor blade, into the rotor blade and screwed. The flange is screwed to the rotor hub at its end opposite to the rotor blade base. This construction of the rotor blade connection is relatively complicated and heavy structurally, since the metallic flange has a high weight. Especially disadvantageous is the fact that the rotor blade is significantly weakened in the region of the rotor blade base by the passage bore for receiving the bolt.

An additional, known wind energy plant displays as the rotor blade connection a steel flange joint, in which the rotor blade base is clamped between an inner and an outer flange and the two flanges are screwed together. The joining of the two flanges with the rotor hub takes place by means of a spaced-apart flange ring, with the aid of high-strength expansion screws. In this construction the metallic flanges contribute very often up to a third to the total weight of the rotor blade. Furthermore, the force progression is unfavorable, due to a radial offset between the rotor blade base and the spaced-apart flange, since this leads to an undesired lever effect.

In the case of the above mentioned experimental AEOLUS II, a so-called cross-bolt connection is used, in which the so-called cross bolts are arranged in passage bores in the region of the rotor blade base (i.e. the hub-side end region of the rotor blade), which passage bores are formed in the rotor blade and pass completely through the latter. The cross bolts arranged inside the passage bores are laminated into the rotor blade and serve as anchoring elements inside the rotor blade. The cross bolts are in each case connected to a tensioning element, formed as a bolt-shaped tension rod, that is screwed together with the rotor hub. By means of the tensioning element, which is subjected to tension, the rotor blade is pressed against the hub and thus held. In this construction it is likewise especially disadvantageous that the rotor blade is greatly weakened in the region of the rotor blade base by the passage bores for receiving the cross bolts. Furthermore, the force progression in the region of the flange-like rotor hub is unfavorable.

Therefore, there is a need for a rotor blade for use on a wind energy plant, in which the disadvantages of the prior art are to a large extent avoided, and which have an easily producible and secure connection between the rotor blade and the rotor hub, which connection is able to withstand extreme stresses.

There is a further need for a rotor blade for use on a wind energy plant, in which the disadvantages of the prior art are to a large extent avoided, and which have an easily producible and secure connection between the rotor blade and the rotor hub, which connection is able to withstand extreme stresses yet which can be easily and efficiently removed and replaced.

Over the years different approaches have been tried out, as can be seen in U.S. Pat. No. 4,915,590 that discloses a wind turbine blade attachment method. This prior art blade attachment comprises fibre glass sucker rods secured in the blade root, which sucker rods are unbonded to the blade root for a substantial portion forming a free end at the root end, and further the free end of the sucker rods are recessed from the blade root end, which means that the sucker rods can be put under tension. The patent indicates that the sucker rods may be unbonded to the rotor blade for approximately 85% of the length. The sucker rods are tapered down in diameter toward the secured end in the bonded area, where the rod is mated internally to the blade. Although this may be appropriate for relatively small blades used on wind turbines in August 1987, when this US-application was filed, this prior art construction is not suited, however, for the relatively large blades currently used, as the sucker rods will not be able to withstand the very large forces present at the blade root of large blades, especially as the rods are only bonded to the blade root to a very limited extent.

In the blade attachment of WO-A2-01/42647, the blade is connected to the hub by bolts screwed into inserts provided in radial holes in the blade root. It is a disadvantage however, that radial holes must be provided in the blade root, as these holes seriously weaken the construction and provides a stress concentration, which means that the blade root must be constructed to be very strong and hence heavy, which again stresses the construction.

A similar construction is described in U.S. Pat. No. 6,371,730, which discloses a blade connected to the hub by bolts screwed into nuts inserted into radial blind holes in the blade root. Although the holes are not through-going, they nonetheless seriously weaken the blade root, and hence this construction is also not advantageous.

It has also been tried to provide a blade root with fully bonded or embedded bushings each having a projecting threaded bolt part, as disclosed in U.S. Pat. No. 4,420,354. This prior art incorporates drilling a relatively large axially extending hole in the blade root made of a wood-resin composite, in which hole the bushing, having a preformed resin sleeve, is resin bonded. With this prior art a relatively large amount of blade root material is removed, which weakens the construction, so the blade root must be over-dimensioned. Especially with large blades of modern composites like fibre-reinforced plastics, which are relatively flexible, stress concentration at the end of the bushings may be detrimental, as the bushings are significantly more stiff. Moreover this prior art method is somewhat destructive, and as fibre composites for the blade root are quite expensive, and increasingly will be as larger blades are developed, as it is expected that high-tech materials like carbon fibre composites will be introduced, this procedure is not favorable.

In general, prior art methods of the kind set forth are quite labor intensive and time consuming, as the bushings are spaced by blocks of e.g. a foam material, and the blocks and the bushings must be arranged carefully. Further there is a risk of air pockets being formed in the blade root between the bushings and the blocks, and such air pockets, which are difficult to detect, will seriously deteriorate the strength of the blade root.

SUMMARY OF THE INVENTION

The above-discussed disadvantages of the prior art are overcome by a wind power generating unit embodying the present invention.

The wind generator embodying the present invention has several defining features:

It need not be mounted on the ground but can be mounted on another structure.

1. Detachable trailing blades or wind foils.
2. A non-metallic nacelle housing a generator/alternator to protect it from the weather and guide the wind into the trailing blades.
3. A conical shroud or cowling around the perimeter of the blades to gather more wind and increase its velocity. To minimize handling problems, the cowling may be in several pieces that lock together.
4. Removable and replaceable non metallic blade designs widest at the perimeter to capture more low velocity wind and designed to be light weight and low cost.
5. A detachable non-metallic hub which holds the blades and can be adjusted to blow off the driveshaft if the wind exceeds some predetermined velocity. The three to twelve (optionally six) separate blades are mounted on that hub that is attached to a mating hub on the the generator driveshaft by adjustable spring clips that allow the release of the hub at a predetermined force, to prevent damage if the wind blows too strongly. This allows considerable flexibility in blade design without requiring complex design change.

6. The hollow hub will enclose a tether or bungee cord to retain the blade assembly if it blows off and prevents loss or damage to people or surroundings.

7. Plastic, sound deadening support structures, including fabric guy wires that will not conduct sound or electricity and attract lightning.

8. A sound-deadening base or foot mounted on a closed cell foam pad to further minimize the noise of the wind generator transmitted to the structure below.

9. A flat tin mounted vertically on the mounting pole and on the outside of the cowling. It is wider than the maximum diameter of the cowling and serves as an additional guide to keep the entire assembly in line with the wind. It extends from the leading edge of the cowling past the trailing edge.

The replaceable blades are easily removable having keyed mounting anchors that slip downwind in to matching slots on the hub which have a positive stop at the leeward end to prevent accidental loss in high winds. The hub may have twelve slots, to accommodate 2, 3, 4, 6, or 12 blades. The interchangeable blades may have various configurations to accommodate different wind conditions. The blades fill from 80% to 100% of the opening between the cowling and the nacelle that houses the alternator/generator. The blades are set at an angle to the wind so that the space between the trailing edge of one blade and the leading edge of the adjacent blade allows the wind to flow through the device and determines the rotational velocity of the impeller at various wind speeds.

Single blades are easier to make and ship than a complete windmill assembly, and will allow local labor to adjust to the optimum local conditions. Blades are light weight, non-metallic and weather durable The wind generator of the present invention is mounted on a heavy plastic (PVC) pipe 1 to 3 inches (2.5 to 7.5 cm) in diameter. The cowling is also mounted on this pipe, at its leading (largest) edge, so that it will swing to face the wind. Unlike metal, PVC transmits relatively little sound and is not an electric conductor which will attract lightning. It slips over a slightly smaller PVC support pipe so that it is free to swing with the wind. The smaller 1 to 2.5 inch support pipe is mounted at the highest point of the structure it supplies on a PVC base on top of a closed cell foam pad to minimize sound and electric transmission. PVC pipes are strong, but flexible, so the mounting pole has guy wires atop it to hold it steady in higher winds from any direction. The guy wires are also fabric, (e.g., clothes line) rather than metal to minimize both sound and electrical transmission. Guy wires are attached to the highest point on the support pole to avoid contact with the windmill assembly on its mounting pole. The fabric guy wires are to be inexpensive and replaceable, since any line exposed to weather will be eroded away with time. The tension on the guy wires should be minimal to prevent movement of the pole without compressing it onto the structure on which the assembly is mounted.

The alternator/generator can be any off-the-shelf model commensurate with the size of the wind generator assembly embodying the present invention. Alternators are preferred, since they have no brushes and are quieter and less subject to wear. They should produce low voltage (6 to 18) volts to minimize the drag on the windmill blades. To allow storage in common batteries a rectifier may be required. Storage is necessary, since wind is extremely fickle and cannot be expected to blow when there is demand. Wires from the alternator/rectifier will penetrate the mounting pole to commutators mounted therein and to matching commutators on the support pole to receive the electric power and send it through wires inside the mounting pole into storage batteries in the structure below. Since the voltage is low and the amperage high, wires to the batteries should be as short and as large as possible. (Preferably braided, gage 0 to 5).

The off-the-shelf alternator/generator (most likely automotive) is housed in a plastic nacelle which also guides incoming wind into the trailing blades. The preferred nacelles are in two parts threaded together to allow for servicing the unit. The nacelle is mounted on the mounting pole, substantially windward of its center to promote the turning of the assembly into the wind at very low wind speeds. The preferred nacelle should be long, allowing for the placement of the heavy alternator in a position to balance the unit and minimize the friction between the support pole and the mounting pole. There is a cap on the support pole which serves to seal out the rain and weather from the wires and the structure below as well as to anchor the three or four guy wires that stabilize the assembly against the wind.

Light wind generators are small. They serve one or two families, not thousands. They generate Kilowatt hours instead of Megawatt hours of electricity. Average diameter of the cowling ranges from about 40 inches to 90 inches. Few exceed 8 feet in diameter. This eliminates essentially all of the wind shear stresses that assail the massive wind generators one sees on the landscape. That encourages small replaceable components rather than large durable ones. Since they are not mounted on the ground but on structures, most of which are occupied, minimizing sound transmission is important. Making them out of weatherproof plastic or other non-metallic materials minimizes not only sound, but lightning problems. That also allows the easy redesign and replacement of its few specialized components. There should be thousands of them, not dozens, which encourages mass production and low costs. These characteristics differ drastically from those of massive windmills which encounter different challenges. The small size of the unit embodying the present invention eliminates essentially all of the stresses on the blades and allows them to be light weight.

The height of the windmill assembly influences the optimum performance of the wind generator embodying the present invention. On a peaked roof the assembly should be from about twelve to twenty inches above the highest point of the structure to capitalize on the updraft winds blowing off the peaked roof. On a flat roof, the assembly can be ten feet or more above the highest point of the roof. If the building is surrounded by trees or other structures, it might be as much as twenty feet above the roof That condition may require additional guy wires below the assembly to avoid serious flexing of the support pole, and may also require a larger support pole.

There is a roller bearing mounted around the support pole which supports the mounting pole while allowing it to rotate freely in the wind. The inside diameter of the mounting pole can be only slightly larger than the outside diameter of the support pole, so that it has little freedom to shift but will easily rotate with very small forces of the light winds anticipated. The support pole goes completely through the mounting pole and protrudes above it to hold the guy wires and stabilize the assembly.

The wind generator embodying the present invention includes a conical cowling surrounding the unit. The cowling is a light weight plastic truncated cone whose trailing edge closely surrounds the impeller blades. It is mounted at its leading edge on the mounting pole with several small support struts to stabilize it against heavy winds. It may have a central cone angle of between 45 and 90 degrees.

A supplementary feature of the wind generator embodying the present invention is the flexible impeller blade design to optimize the amount of wind captured and used. The blades can be plain flat triangles set at an angle to the wind, but that is not optimum. Unlike a fan or propeller, the leading edge of the blade for optimum performance should be parallel to the approaching wind, not perpendicular to it. The blade of the invention immediately begins to curve to one side to drive the blade into rotation. The blade is curved preferably in a parabolic curve. In the preferred form of the invention, the blades capture 60% or more of the wind energy, hence the trailing edge is 54 degrees off the wind (60% of the way to perpendicular).

The impeller hub does not drive the generator directly. The windmill is driven by the wind in low revolutions per minute, but the generator requires high rpm. To compensate for this variance, the driving hub of the present unit drives a ring gear inside the nacelle. The ring gear has many internal teeth (40 to 90). Within the ring gear are three smaller gears which drive a still smaller gear on the drive shaft of the generator (6 to 15 teeth). This gearing allows the windmill to drive the generator rapidly in the operating range for which it was designed. The ratio of teeth in the ring gear to those in the generator driving gear can be varied to fit the requirements of the generator chosen, In addition the blades are designed to fill between 75% and 100% of the open space within the trailing edge of the cowling. Three triangular blades with a 90 degree central angle will fill only 75% of the cowling opening. Four such blades will fill 100%. A six bladed rotor might have blades with a central angle of 60 degrees for blades with a deeper pitch, it may be sensible to fill more than 100% of the space, so the trailing edge of a blade is directly behind the leading edge of its following blade. This flexible blade design for replaceable blades is a critical advantage of the wind generator embodying the present invention.

The curve of the blades will also depend upon the depth of the blade. A shallow blade, one inch deep for example, will present a barrier to the wind and tend to stall it rather than accept it. Such a shallow blade will produce very high RPM for the generator, which is desirable. As the blade gets deeper, the rotational velocity of the windmill will decrease, but the barrier to the incoming wind will also decrease. The blades are mounted on a hollow hub the same diameter as the nacelle that houses the generator. The hub is also weatherproof plastic with 12 slots to accept 2, 3, 4, 6 or 12 blades. The slots must not extend the entire length of the hub, but must have a positive stop at the leeward end to prevent the blades from being blown out of their slots. The blades have triangular knobs which fit exactly into the triangular slots on the hub. A slight taper in each will allow easy assembly and disassembly. This allows not only easy replacement in case of damage, but allows a variety of shapes and angles of the blades to optimize the electrical output for the specific wind conditions of the location.

Since the blades are narrowed at the point of attachment where the stresses are maximum, the blades get progressively thicker as they get narrow to withstand the increased stress.

The impeller hub is mounted on the drive shaft of the mounting generator hub with clips that are adjustable with set screws so that the retaining force can be varied. The operator can adjust the clips to yield at pre-determined forces so that if the wind blows too strongly, the entire hub and blade assembly will blow off the unit, but will be retained by the tether so as not to get lost, or to damage people or objects in its path. The tether can be at least twice as long as the diameter of the blade assembly.

Other systems, methods, features, and advantages of the invention will be, or will become, apparent to one with skill in the art upon examination of the following figures and detailed description. It is intended that all such additional systems, methods, features, and advantages be included within this description, and be within the scope of the invention, to be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 shows a hub of the wind power generator embodying the present invention with a plurality of detachable blades mounted thereon.

FIG. 2 shows a blade.

FIG. 3 shows a side view of the blade.

FIG. 5 shows a cross section of the hub.

FIG. 6 shows a detail of the hub with a blade connected thereto.

Figure 7:
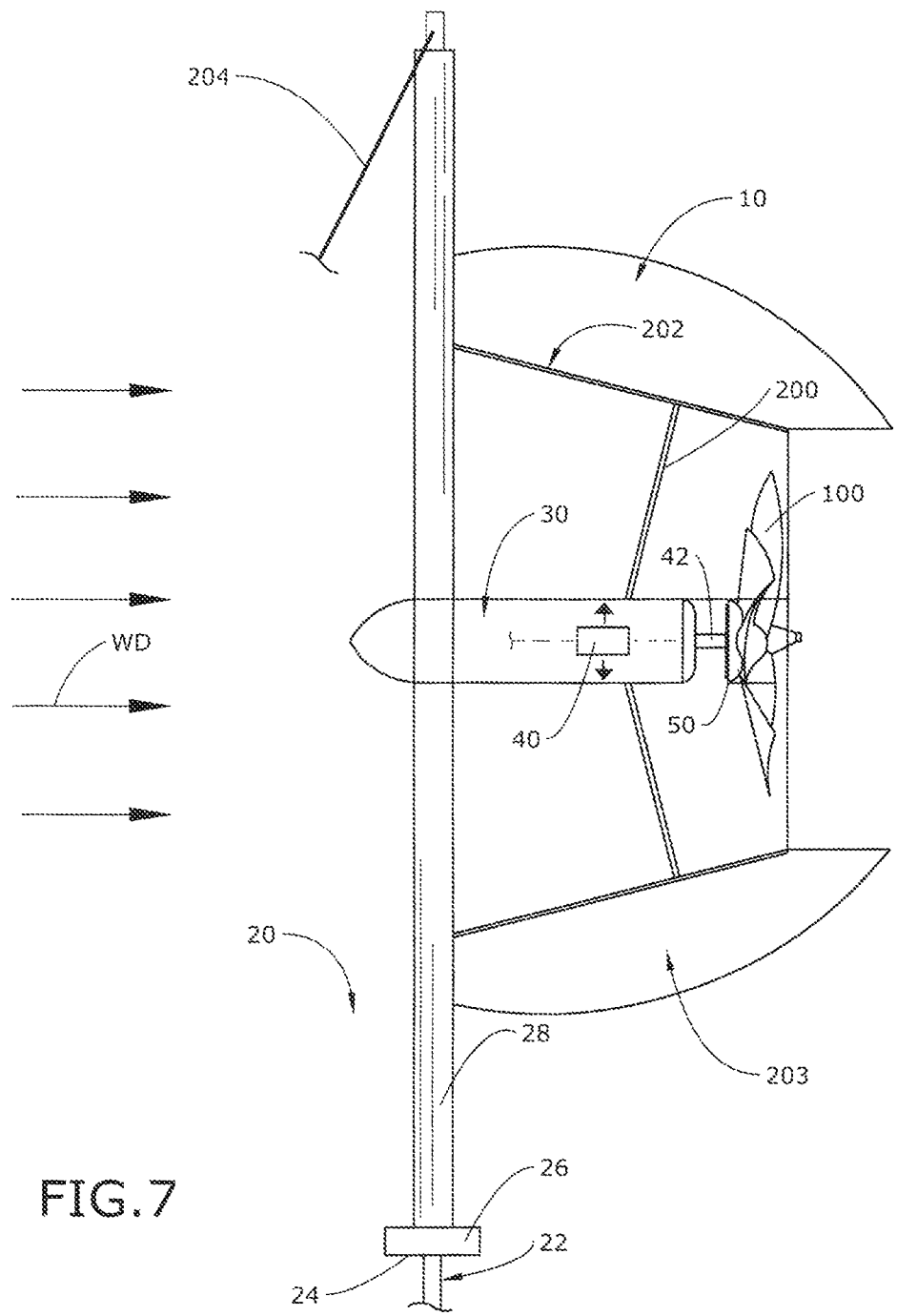

FIG. 7 an elevational view of the wind power generator embodying the present invention.

Figure 8:
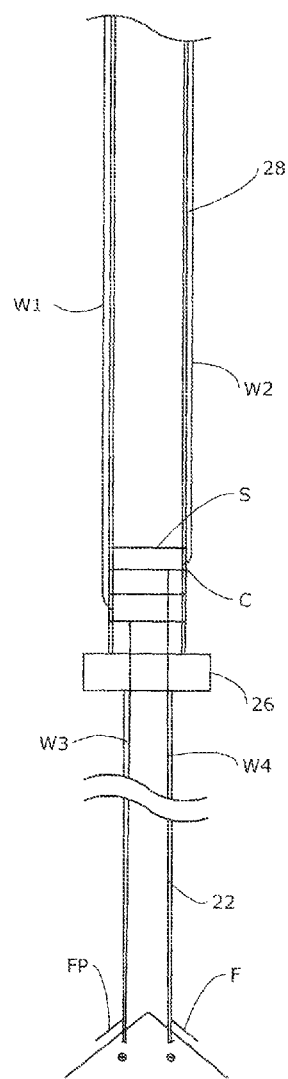

FIG. 8 shows a portion of the support and mounting posts used in the wind power generator of the present invention.

Figure 9:
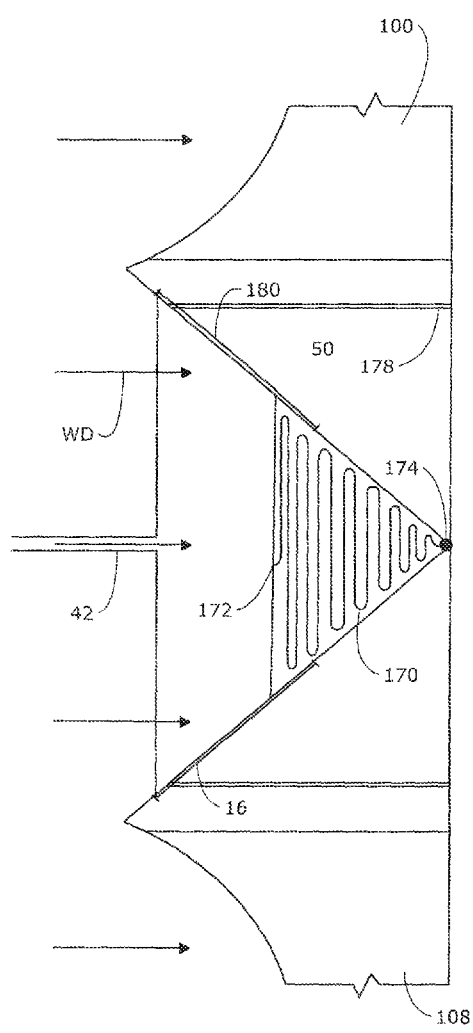

FIG. 9 shows a sketch of the wind power generator of the present invention with a tether element.

FIG. 10 shows gear assembly which operatively connects the hub on which the blades are mounted to a power generator drive shaft.

DETAILED DESCRIPTION OF THE INVENTION

Referring to the figures, it can be understood that the present invention is embodied in a wind power generator 10 comprises a support unit 20 which includes a support pole 22 having a first end 24, a roller bearing 26 on the first end of the support pole, and a mounting pole 28 supported on the first end of the support pole by the roller bearing. Support pole 22 includes a foot F and a foam pad FP.

A nacelle 30 is mounted on the mounting pole and a power converter 40 is located in the nacelle for converting rotational movement into electrical power, the power converter includes a drive shaft 42 and electrical wires W1 and W2, a commutator C, slip rings S. Power converter 40 operates in the known manner and the details of the power converter do not form a portion of this invention. As such, the details of power converter 40 will not be presented herein. A hub 50 is detachably mounted on the drive shaft. Hub 50 includes a first end 52 a second end 54, and an outer surface 56 spaced radially away from the drive shaft and extending between the first end of the hub and the second end of the hub. A plurality of slots, such as slot 60, are defined in the outer surface. The slots are identical and, referring to FIGS. 5 and 6, each slot includes a first end 62 which is open and coplanar with the first end of the hub, a second end 64 which is spaced apart from the first end of the slot and which is spaced apart from the second end of the hub and which is closed by a wall 65 formed by the body of the hub, a bottom surface 66 located to be spaced radially away from the outer surface of the hub and which extends from the first end of the slot to the second end of the slot. Bottom surface 66 has a first side edge 68 and a second side edge 70 and a width dimension 72 which extends between the first side edge of the slot and the second side edge of the slot. Bottom surface 66 of the slot is spaced apart from outer surface 56 of the hub to define a gap 74. Gap 74 has a first side 76 and a second side 78 and a width dimension 80 which extends between the first side of the gap and the second side of the gap. Each slot further includes two side walls 82 and 84 which extend from the outer surface of the hub to the bottom surface of the slot and which are inclined with respect to each other so that bottom surface width dimension 72 is greater than width dimension 80 of the gap and thus form a sidewall slot. The slots 60 are spaced apart from each other circumferentially about the hub.

Generator 10 further includes a plurality of identical airfoil blades, such as blade 100 shown best in FIGS. 1, 2 and 3. Each blade is detachably mounted on the hub via one of the slots. Each airfoil blade includes a body 110 having a first edge 112 which is a leading edge when the blade is in use, a second edge 114 which is a trailing edge when the blade is in use, a transverse axis 116 which extends between the first edge of the blade and the second edge of the blade, a first end 120 which is a root end when the blade is mounted on the hub, and a second end 122 which is spaced apart from the first end of the blade. Each blade has parabolic shape 124 along the transverse axis. As can be understood from the figures, the blades are mounted on the hub to be downwind of the power converter located in the nacelle, with the wind direction being indicated by arrows WD in the figures. As can be understood from the figures, each blade is spaced apart from the first end of the hub when the blade mounting element is accommodated in an associated slot. In one form of the invention, the blades are formed of plastics material.

Each blade has a blade mounting element 130 on root end 120 of the blade. Each blade mounting element 130 includes a first surface 140 which is a bottom surface when the blade is mounted on the hub and which abuts bottom surface 66 of the slot when the blade is mounted on the hub. First surface 140 of the blade mounting element has a first side 142 and a second side 144 and a width dimension 146 extending between the first side of the blade mounting element and the second side of the blade mounting element, the width dimension of the blade mounting element first side being sized with respect to the slot bottom surface width dimension so the blade mounting element is slidably and snugly accommodated in the slot. Each slot further includes two side walls 148 and 150, which extend from the first surface of the blade mounting element and are inclined toward each other as they extend from the first surface of the blade mounting element and are in abutting contact with the slot side walls when the blade mounting element is accommodated in the slot. The inclined sidewalls of the blade mounting element can be considered as protrusions which are accommodated in the sidewall slots defined in the hub. Each blade mounting element further includes a first end 160 which is flush with first end 52 of the hub when the blade mounting element is accommodated in the slot, and a second end 162 which is in abutting contact with second end 64 of the slot when the blade mounting element is accommodated in the slot, and a second surface 166 which is a top surface when the blade is mounted on the hub and which is flush with the outer surface of the hub when the blade mounting element is accommodated in the slot.

Figure 4:
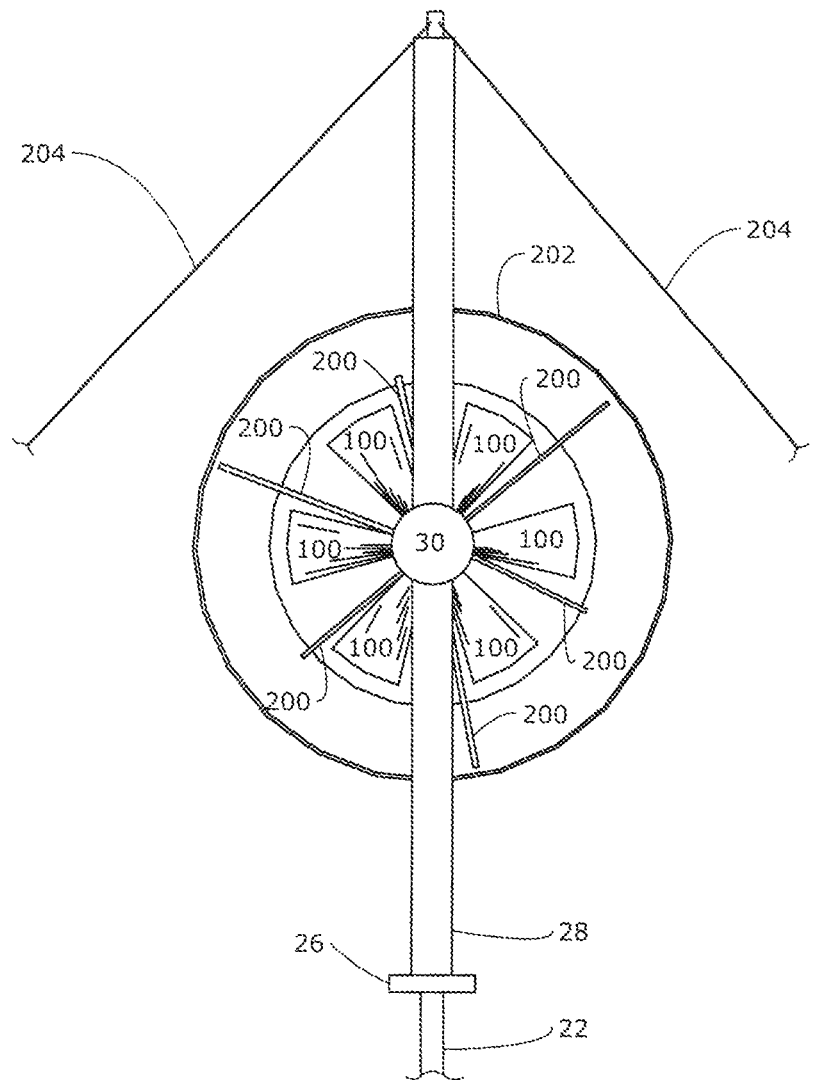
FIG. 4 shows an end view of the hub with a blade mounted thereon.

As can be seen in FIG. 9, wind power generator 10 further including a tether 170 attached to the hub and to each blade to tie a blade to the hub in the event the blade becomes detached from the hub, and the airfoil blades are located downwind of the nacelle. The tether is attached by elements 172 and 174. Fasteners, such as fasteners 178 and clips 180, can also be included to further ensure against unwanted separation of the blades from the hub. As can be understood from FIG. 4, wind generator 10 further includes support struts 200 and a cowling 202 as well as guy wires, such as guy wire 204.

A vertical flat fin 203 is mounted on the mounting pole 22 outside of the conical cowling 202 to which it attaches or is bonded. The flat fin extends beyond the cowling and the windmill blades to further enhance its ability to swing the entire assembly so it faces the wind.

A plastic conical cowling is mounted by its large windward edge on the mounting pole 22 and its smaller trailing edge closely surrounds the windmill blades. The conical angle of the cowling may vary from about 45° to about 90° depending upon the prevailing wind conditions at the mounting location. It may be in several interlocking pieces some of which may accommodate additional stabilizing struts to the nacelle or the mounting pole 22.

Non-metallic guy wires attached to the top of the support pole 22, extend from its mounting base completely through the mounting pole and beyond, allow the mounting pole to withstand strong wings without disabling flexure.

Since the generator of the present invention is designed to operate primarily in light winds, it may need a transmission to drive those off-the-shelf alternator/generators that are designed primarily for automotive use and operate at relatively high rotational speeds. The following description refers to FIG. 10. The generator will not achieve those speeds in the very light winds that are their primary source of energy. Instead of mounting the windmill directly on the generator shaft, the hub 50 (partially shown in FIG. 10) is mounted on a circular ring gear 220 that has forty to ninety internal teeth, such as tooth 222. Then mount on the generator shaft 224 a much smaller gear 226 with ten to fifteen teeth, such as tooth 228, of the same size as those on the windmill ring gear 220. This leaves a space 230 between the windmill ring gear 220 and the generator gear 226. There are three small idle gears 234 whose diameter is equal to the space between the windmill gear and the generator gear. These three idle gears have teeth, such as tooth 238, which are the same size teeth as the generator and windmill gears and are mounted every 120 degrees around the generator gear. The three idle gears will minimize the shear stress on the generator gear and drive it in the opposite direction of the windmill gear, but at remarkably higher speeds. The ratio of teeth in the windmill ring gear to those in the generator will determine how fast the generator will be driven. This arrangement keeps the power on the same axis and there need not be any offset between the windmill shaft and the generator shaft. The ratios between ring and generator gears can be custom designed for the conditions in which the generator is deployed.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A wind power generator comprising:
A) a support unit which includes
a support pole having a first end,
a roller bearing on the first end of the support pole, and
a mounting pole supported on the first end of the support pole by the roller bearing;
B) a nacelle mounted on the mounting pole;
C) power converter located in the nacelle for converting rotational movement into electrical power, the power converter including a drive shaft;
D) a hub detachably mounted on the drive shaft, the hub including
a first end, and a second end,
an outer surface spaced radially away from the drive shaft and extending between the first end of the hub and the second end of the hub,
a plurality of slots defined in the outer surface, each slot including
a first end which is coplanar with the first end of the hub,
a second end which is spaced apart from the first end of the slot and which is spaced apart from the second end of the hub,
a bottom surface located to be spaced radially away from the outer surface of the hub and which extends from the first end of the slot to the second end of the slot, the bottom surface having a first side edge and a second side edge and a width dimension which extends between the first side edge of the slot and the second side edge of the slot, the bottom surface of the slot being spaced apart from the outer surface of the hub to define a gap, the gap having a first side and a second side and a width dimension which extends between the first side of the gap and the second side of the gap,
two side walls which extend from the outer surface of the hub to the bottom surface of the slot and which are inclined with respect to each other so that the bottom surface width dimension is greater than the width dimension of the gap, and the slots being spaced apart from each other circumferentially about the hub; and a plurality of airfoil blades each blade being detachably mounted on said hub via one of said slots, each airfoil blade including
a body having a first edge which is a leading edge when the blade is in use, a second edge which is a trailing edge when the blade is in use, a transverse axis which extends between the first edge of the blade and the second edge of the blade, a first end which is a root end when the blade is mounted on the hub, and a second end which is spaced apart from the first end of the blade,
a blade mounting element on the root end of the blade, the blade mounting element including
a first surface which is a bottom surface when the blade is mounted on the hub and which abuts the bottom surface of the slot when the blade is mounted on the hub, the first surface of the blade mounting element having a first side and a second side and a width dimension extending between the first side of the blade mounting element and the second side of the blade mounting element, the width dimension of the blade mounting element first side being sized with respect to the slot bottom surface width dimension so the blade mounting element is slidably accommodated in the slot,
two side walls which extend from the first surface of the blade mounting element and are inclined toward each other as they extend from the first surface of the blade mounting element and are in abutting contact with the slot side walls when the blade mounting element is accommodated in the slot,
a first end which is flush with the first end of the hub when the blade mounting element is accommodated in the slot,
a second end which is in abutting contact with the second end of the slot when the blade mounting element is accommodated in the slot, and
a second surface which is a top surface when the blade is mounted on the hub and which is flush with the outer surface of the hub when the blade mounting element is accommodated in the slot.

2. The wind power generator defined in claim 1 wherein the body of each blade has a parabolic shape along the transverse axis.

3. The wind power generator defined in claim 2 wherein the blades are mounted on the hub to be downwind of the power converter located in the nacelle.

4. The wind power generator defined in claim 1 further including a tether attached to the hub to prevent loss or damage if the wind blows the hub off its mounting.

5. The wind power generator defined in claim 1 wherein the blades are formed of plastic materials.

6. The wind power generator defined in claim 1 wherein the root of each blade is spaced apart from the first end of the hub when the blade mounting element is accommodated in an associated slot.

7. A wind power generator comprising:
A) a support unit which includes
a mounting pole having a first end;
B) a nacelle mounted on the mounting pole;
C) power converter located in the nacelle for converting rotational movement into electrical power, the power converter including a drive shaft;
D) a hub detachably mounted on the drive shaft, the hub including
a first end, and a second end,
an outer surface spaced radially away from the drive shaft and extending between the first end of the hub and the second end of the hub,
a plurality of blade accommodating slots defined in the outer surface, each blade accommodating slot including
a first end which is coplanar with the first end of the hub, the first end being open,
a second end which is spaced apart from the first end of the blade accommodating slot and which is spaced apart from the second end of the hub, a the hub forming a wall which covers the second end of the blade accommodating slot,
a bottom surface located to be spaced radially away from the outer surface of the hub and which extends from the first end of the blade accommodating slot to the second end of the blade accommodating slot, the bottom surface having a first side edge and a second side edge and a width dimension which extends between the first side edge of the blade accommodating slot and the second side edge of the blade accommodating slot, the bottom surface of the blade accommodating slot being spaced apart from the outer surface of the hub to define a gap, the gap having a first side and a second side and a width dimension which extends between the first side of the gap and the second side of the gap,
two side walls which extend from the outer surface of the hub to the bottom surface of the blade accommodating slot,
a sidewall slot defined in each side wall of the blade accommodating slot and which extends from the first end of the blade accommodating slot to the second end of the blade accommodating slot, and
the blade accommodating slots being spaced apart from each other circumferentially about the hub; and
E) a plurality of airfoil blades each blade being detachably mounted on said hub via one of said blade accommodating slots, each airfoil blade including
a body having a first edge which is a leading edge when the blade is in use, a second edge which is a trailing edge when the blade is in use, a transverse axis which extends between the first edge of the blade and the second edge of the blade, a first end which is a root end when the blade is mounted on the hub, and a second end which is spaced apart from the first end of the blade,
a blade mounting element on the root end of the blade, the blade mounting element including
a first surface which is a bottom surface when the blade is mounted on the hub and which abuts the bottom surface of a blade accommodating slot when the blade is mounted on the hub, the first surface of the blade mounting element having a first side and a second side and a width dimension extending between the first side of the blade mounting element and the second side of the blade mounting element, the width dimension of the blade mounting element first side being sized with respect to the blade accommodating slot bottom surface width dimension so the blade mounting element is slidably accommodated in the blade accommodating slot,
two side walls which extend from the first surface of the blade mounting element and which are in abutting contact with the blade accommodating slot side walls when the blade mounting element is accommodated in the blade accommodating slot,
a protrusion on each side wall of the blade mounting element, the protrusions being sized and located on the side walls of the blade mounting element to be slidingly and snugly received in the sidewall slot defined in each side wall of the blade accommodating slot associated with the blade mounting element,
a first end which is flush with the first end of the hub when the blade mounting element is accommodated in the slot,
a second end which is in abutting contact with the wall at the second end of the blade accommodating slot when the blade mounting element is accommodated in the blade accommodating slot, and
a second surface which is a top surface when the blade is mounted on the hub and which is flush with the outer surface of the hub when the blade mounting element is accommodated in the blade accommodating slot.

8. A wind power generator system comprising:
A) a support unit which includes
a support pole having a first end,
a roller bearing on the first end of the support pole, and
a mounting pole supported on the first end of the support pole by the roller bearing;
B) a nacelle mounted on the mounting pole;
C) power converter located in the nacelle for converting rotational movement into electrical power, the power converter including a generator drive shaft;
D) a hub detachably mounted on the generator drive shaft, the hub including
a first end, and a second end,
an outer surface spaced radially away from the drive shaft and extending between the first end of the hub and the second end of the hub,
a plurality of slots defined in the outer surface, each slot including
a first end which is coplanar with the first end of the hub,
a second end which is spaced apart from the first end of the slot and which is spaced apart from the second end of the hub,
a bottom surface located to be spaced radially away from the outer surface of the hub and which extends from the first end of the slot to the second end of the slot, the bottom surface having a first side edge and a second side edge and a width dimension which extends between the first side edge of the slot and the second side edge of the slot, the bottom surface of the slot being spaced apart from the outer surface of the hub to define a gap, the gap having a first side and a second side and a width dimension which extends between the first side of the gap and the second side of the gap,
two side walls which extend from the outer surface of the hub to the bottom surface of the slot and which are inclined with respect to each other so that the bottom surface width dimension is greater than the width dimension of the gap, and
the slots being spaced apart from each other circumferentially about the hub; and
E) a plurality of airfoil blades each blade being detachably mounted on said hub via one of said slots, each airfoil blade including
a body having a first edge which is a leading edge when the blade is in use, a second edge which is a trailing edge when the blade is in use, a transverse axis which extends between the first edge of the blade and the second edge of the blade, a first end which is a root end when the blade is mounted on the hub, and a second end which is spaced apart from the first end of the blade,
a blade mounting element on the root end of the blade, the blade mounting element including
a first surface which is a bottom surface when the blade is mounted on the hub and which abuts the bottom surface of the slot when the blade is mounted on the hub, the first surface of the blade mounting element having a first side and a second side and a width dimension extending between the first side of the blade mounting element and the second side of the blade mounting element, the width dimension of the blade mounting element first side being sized with respect to the slot bottom surface width dimension so the blade mounting element is slidably accommodated in the slot,
two side walls which extend from the first surface of the blade mounting element and are inclined toward each other as they extend from the first surface of the blade mounting element and are in abutting contact with the slot side walls when the blade mounting element is accommodated in the slot, a first end which is flush with the first end of the hub when the blade mounting element is accommodated in the slot, a second end which is in abutting contact with the second end of the slot when the blade mounting element is accommodated in the slot, a second surface which is a top surface when the blade is mounted on the hub and which is flush with the outer surface of the hub when the blade mounting element is accommodated in the slot; and F) a gear system operatively connecting the power converter drive shaft of the power converter to the hub to convert rotation of the hub into rotation of the power converter drive shaft, the gear system including a circular ring gear mounted on the hub and which has 40 to 60 internal teeth, a gear on which the power converter drive shaft is mounted and which has 10 to 15 teeth which are smaller than the gear teeth on the ring gear, and three idle gears connecting the ring gear to the gear on the power converter drive shaft, the three idle gears being mounted 120 degrees apart from each other around the gear on the power converter drive shaft.

\* \* \* \* \*